(12) United States Patent
Kurahashi et al.

(10) Patent No.: US 12,327,696 B2
(45) Date of Patent: Jun. 10, 2025

(54) ELECTRODE FOIL FOR ELECTROLYTIC CAPACITOR, ELECTROLYTIC CAPACITOR, AND METHOD FOR MANUFACTURING ELECTROLYTIC CAPACITOR

(71) Applicant: Panasonic Intellectual Property Management Co., Ltd., Osaka (JP)

(72) Inventors: Hideyuki Kurahashi, Tokyo (JP); Naomi Kurihara, Osaka (JP); Mitsuhisa Yoshimura, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 124 days.

(21) Appl. No.: 17/905,498

(22) PCT Filed: Jan. 29, 2021

(86) PCT No.: PCT/JP2021/003306
§ 371 (c)(1),
(2) Date: Sep. 1, 2022

(87) PCT Pub. No.: WO2021/192607
PCT Pub. Date: Sep. 30, 2021

(65) Prior Publication Data
US 2023/0131142 A1    Apr. 27, 2023

(30) Foreign Application Priority Data

Mar. 27, 2020   (JP) ................. 2020-058678

(51) Int. Cl.
*H01G 9/07*     (2006.01)
*H01G 9/00*     (2006.01)
(Continued)

(52) U.S. Cl.
CPC ............ *H01G 9/07* (2013.01); *H01G 9/0032* (2013.01); *H01G 9/028* (2013.01); *H01G 9/042* (2013.01); *H01G 9/055* (2013.01)

(58) Field of Classification Search
CPC ...... H01G 9/042; H01G 9/0032; H01G 9/028; H01G 9/055; H01G 9/07
See application file for complete search history.

(56) References Cited

U.S. PATENT DOCUMENTS

| | | | | |
|---|---|---|---|---|
| 4,131,520 A | * | 12/1978 | Bernard | ................ C25D 11/26 205/171 |
| 2005/0219801 A1 | * | 10/2005 | Yano | ........................ H01G 9/15 361/523 |

(Continued)

FOREIGN PATENT DOCUMENTS

| | | |
|---|---|---|
| JP | 7-082968 B | 9/1995 |
| WO | 2015/118902 | 8/2015 |
| WO | 2019/167773 | 9/2019 |

OTHER PUBLICATIONS

International Search Report of PCT application No. PCT/JP2021/003306 dated Apr. 20, 2021.

*Primary Examiner* — David M Sinclair
(74) *Attorney, Agent, or Firm* — Rimon P.C.

(57) ABSTRACT

An electrode foil for an electrolytic capacitor includes: an anode body that includes a core part and a porous part disposed on a surface of the core part, and contains a first metal; a first dielectric layer that covers at least a part of the porous part; and a second dielectric layer that covers at least a part of the first dielectric layer. The second dielectric layer contains an oxide of a second metal. The first dielectric layer includes a first part having a thickness $T_1$ and a second part having a thickness $T_2$ smaller than the thickness $T_1$.

13 Claims, 2 Drawing Sheets

(51) Int. Cl.
*H01G 9/028* (2006.01)
*H01G 9/042* (2006.01)
*H01G 9/055* (2006.01)

(56) References Cited

U.S. PATENT DOCUMENTS

| | | | |
|---|---|---|---|
| 2008/0094775 A1* | 4/2008 | Sneh | H01G 9/055 |
| | | | 29/25.42 |
| 2009/0080143 A1* | 3/2009 | Kobayashi | H01G 9/15 |
| | | | 29/25.03 |
| 2012/0200985 A1* | 8/2012 | Shoji | C22C 21/00 |
| | | | 428/654 |
| 2013/0050904 A1* | 2/2013 | Nemoto | H01G 9/04 |
| | | | 361/528 |
| 2013/0342966 A1* | 12/2013 | Horio | H01G 9/07 |
| | | | 29/25.03 |
| 2014/0022702 A1* | 1/2014 | Petrzilek | H01G 9/025 |
| | | | 205/199 |
| 2014/0334070 A1* | 11/2014 | Kobayashi | H01G 9/042 |
| | | | 29/25.03 |
| 2016/0322171 A1 | 11/2016 | Saeki et al. | |
| 2018/0358181 A1* | 12/2018 | Ogawa | C25D 11/10 |
| 2020/0373090 A1 | 11/2020 | Yoshimura et al. | |

\* cited by examiner

ELECTRODE FOIL FOR ELECTROLYTIC CAPACITOR, ELECTROLYTIC CAPACITOR, AND METHOD FOR MANUFACTURING ELECTROLYTIC CAPACITOR

TECHNICAL FIELD

The present disclosure relates to an electrode foil for an electrolytic capacitor, an electrolytic capacitor, and a method for manufacturing an electrolytic capacitor.

BACKGROUND

An electrode foil of an electrolytic capacitor includes an anode body and a dielectric layer covering the anode body. A base material such as a metal foil containing a valve metal is used for the anode body. From the viewpoint of increasing an electrostatic capacity, a surface of the base material is roughened by etching or the like. That is, the anode body includes a core part and a porous part disposed on a surface of the core part, and the surface of the porous part is covered with the dielectric layer. Various studies have been made on the electrode foil, such as a material to be used (for example, International Publication WO 2015/118902).

SUMMARY

An electrode foil for an electrolytic capacitor according to one aspect of the present disclosure includes: an anode body including a core part and a porous part disposed on a surface of the core part, the anode body containing a first metal; a first dielectric layer covering at least a part of the porous part; and a second dielectric layer covering at least a part of the first dielectric layer, the second dielectric layer containing an oxide of a second metal. The first dielectric layer includes a first part having a thickness $T_1$, and a second part having a thickness $T_2$ smaller than the thickness $T_1$.

An electrolytic capacitor according to another aspect of the present disclosure includes: the above-described electrode foil; and a solid electrolyte layer covering at least a part of the second dielectric layer of the electrode foil. The solid electrolyte layer contains a conductive polymer.

A method for manufacturing an electrolytic capacitor according to still another aspect of the present disclosure includes: a first step of obtaining an anode body that includes a core part and a porous part disposed on a surface of the core part, the anode body containing a first metal, at least a part of the porous part being covered with a first dielectric layer; a second step of removing at least a part of the first dielectric layer by an atomic layer etching method or acid immersion; and a third step of obtaining an electrode foil by forming a second dielectric layer that contains an oxide of a second metal to cover at least a part of the porous part.

According to the present disclosure, an electrolytic capacitor having a large electrostatic capacity can be obtained.

DESCRIPTION OF EMBODIMENT

Figure 1:
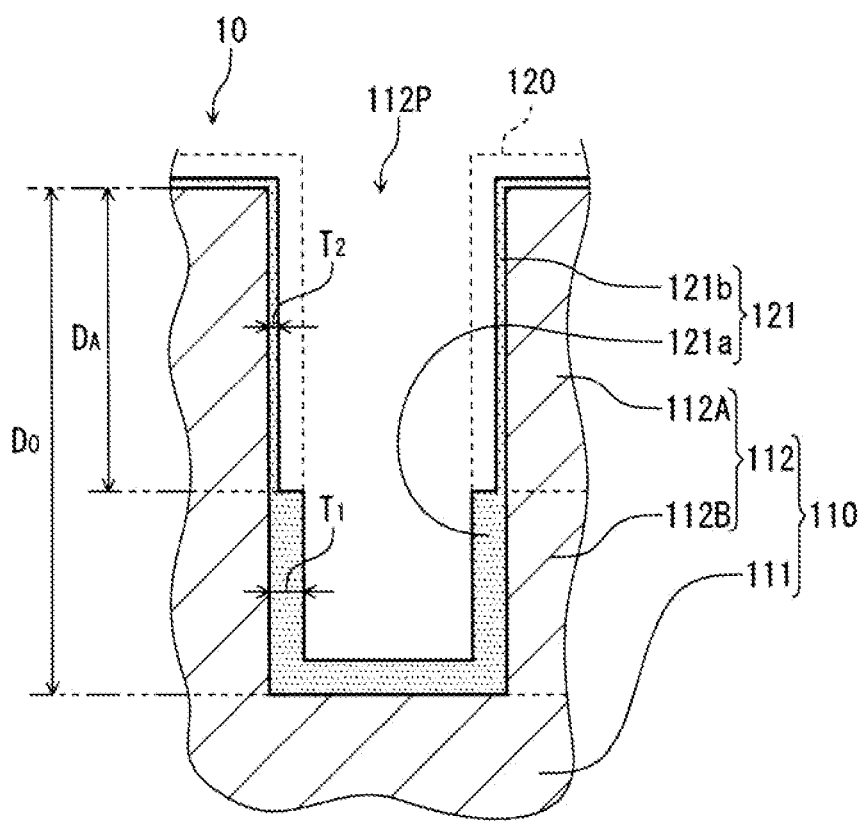
FIG. 1 is a cross-sectional view schematically illustrating a surface part of an electrode foil according to an exemplary embodiment of the present disclosure.

Prior to the description of the exemplary embodiments, a problem in the prior art will be briefly described below.

Since a surface (porous part) of the anode body comes into contact with air by retaining the anode body in an atmospheric air or the like, a natural oxide film is likely to be formed on the surface of the anode body. Further, the natural oxide film may contain impurities derived from the anode body. Due to the presence of the natural oxide film, an electrostatic capacity may not be sufficiently obtained.

In view of the above problem, the present disclosure provides an electrode foil for an electrolytic capacitor, an electrolytic capacitor, and a method for manufacturing an electrolytic capacitor for providing an electrolytic capacitor having a large electrostatic capacity.

[Electrode Foil for Electrolytic Capacitor]

An electrode foil for an electrolytic capacitor according to the present exemplary embodiment includes: an anode body including a core part and a porous part disposed on a surface of the core part, the anode body containing a first metal; a first dielectric layer covering at least a part of the porous part; and a second dielectric layer covering at least a part of the first dielectric layer, the second dielectric layer containing an oxide of a second metal. The first dielectric layer includes a first part having a thickness $T_1$ and a second part having a thickness $T_2$ smaller than the thickness $T_1$.

The first dielectric layer includes a natural oxide film, and may include an oxide of the first metal derived from the anode body. Further, the natural oxide film may also contain impurities derived from the anode body. An electrostatic capacity of the electrolytic capacitor may not be sufficiently obtained due to the natural oxide film.

On the other hand, in the present disclosure, by performing surface treatment by an atomic layer etching (ALE) method or acid immersion, a thickness of a part of the first dielectric layer decreases from the thickness $T_1$ to the thickness $T_2$ so that the second part is formed. This suppresses a decrease in electrostatic capacity due to the first dielectric layer.

The porous part may include a region A located at a side close to a surface of the anode body and a region B other than the region A. The first dielectric layer may include the second part in the region A, and may include the first part in the region B. When the first dielectric layer includes the second part in the region A of the porous part that is easily covered with the second dielectric layer, the influence of the first dielectric layer is reduced in the region A, and thus the action of the second dielectric layer is efficiently exerted. Hence, the performance of the electrolytic capacitor is easily improved by the second dielectric layer. For example, disposing the second dielectric layer having a high relative dielectric constant makes it easy to increase the capacitance of the electrolytic capacitor.

The porous part has a plurality of pits (holes), and the dielectric layers (first dielectric layer and second dielectric layer) cover an outer surface of the porous part and an inner wall surface of the pit. The first dielectric layer having the thickness $T_2$ (the second part) may cover the outer surface of the porous part as well as the inner wall surface of the pit from the outer surface of the porous part to a depth of a boundary between the region A and the region B (a depth corresponding to the thickness $D_A$ of the region A in FIG. 1).

Further, the first dielectric layer having the thickness $T_1$ (the first part) may cover the inner wall surface of the pit from the depth of the boundary between the region A and the region B of the porous part (the depth corresponding to the thickness $D_A$ of the region A in FIG. 1) to the deepest part (the depth corresponding to the thickness $D_0$ of the porous part in FIG. 1).

The first metal may contain at least one selected from the group consisting of titanium (Ti), tantalum (Ta), niobium (Nb), and aluminum (Al). From the viewpoint of being more advantageous in terms of cost, the first metal preferably contains Al. The first dielectric layer may contain an oxide of the first metal. The oxide of the first metal (first dielectric layer) may contain at least one selected from the group consisting of $TiO_2$, $Ta_2O_5$, $Nb_2O_5$, and $Al_2O_3$.

The second metal may be the same as or different from the first metal. When the second metal is different from the first metal, it is possible to select the second metal capable of forming the second dielectric layer having a high relative dielectric constant without being limited by the first metal, and it is easy to increase the electrostatic capacity of the electrolytic capacitor. Further, since a range of selection of the second metal is widened, it is easy to impart various performances to the second dielectric layer without being limited by the first metal.

The second metal preferably contains at least one selected from the group consisting of tantalum (Ta), titanium (Ti), hafnium (Hf), zirconium (Zr), niobium (Nb), silicon (Si), and aluminum (Al). In this case, the oxide of the second metal has a high relative dielectric constant, and it is easy to increase the electrostatic capacity. The oxide of the second metal (second dielectric layer) preferably contains at least one selected from the group consisting of $Ta_2O_5$, $TiO_2$, $HfO_2$, $ZrO_2$, $Nb_2O_5$, $SiO_2$, and $Al_2O_3$. Among them, $T_1$ and Nb are more preferable as the second metal from the viewpoint of further increasing the relative dielectric constant of the oxide of the second metal. From the viewpoint of improving a withstand voltage, the second metal is more preferably Si, Zr, Hf, or Ta.

The second dielectric layer may be formed by an atomic layer deposition (ALD) method. In this case, it is easy to form the second dielectric layer that is dense and uniform in thickness. The second metal different from the first metal can be selected. When the second dielectric layer contains two or more kinds of oxides of the second metal, the oxides may be mixed, or may be formed in layers. From the viewpoint of increasing the capacitance of the electrolytic capacitor, the oxide of the second metal preferably has a higher relative dielectric constant than the oxide of the first metal.

In a case where a thin and uniform second dielectric layer is formed by the ALD method, a surface of the pit of the porous part (for example, a deep part of the region B) may have macroscopic defects such as pinholes or fine defects such as lattice defects. In this case, insulation can be secured by compensating the defect of the second dielectric layer with the first dielectric layer (first part and second part). Further, diffusion of the metal contained in the anode body into the second dielectric layer is suppressed by the first dielectric layer (first part and second part), which is formed by a covalent bond stronger than a metal bond of the anode body. When the metal contained in the anode body is diffused and doped in the second dielectric layer, the relative dielectric constant and the breakdown withstand voltage may be reduced.

Compositions of the oxide of the first metal contained in the first dielectric layer and the oxide of the second metal contained in the second dielectric layer can be determined by performing elemental analysis by energy dispersive X-ray spectroscopy (EDX) with respect to a cross section of the electrode foil. When the second metal is different from the first metal, the first dielectric layer and the second dielectric layer can be distinguished by element mapping.

Hereinafter, an example of an electrode foil according to the present exemplary embodiment will be described with reference to FIG. 1. FIG. 1 is a cross-sectional view schematically illustrating a surface part of the electrode foil according to the present exemplary embodiment. Note that first dielectric layer 120 (broken line part) in FIG. 1 represents a first dielectric layer before the surface treatment by the ALE method or acid immersion, and first dielectric layer 121 (solid line part) represents a first dielectric layer after the surface treatment by the ALE method or acid immersion.

An electrode foil (anode foil 10) includes anode body 110 containing a first metal, first dielectric layer 121 covering at least a part of anode body 110, and a second dielectric layer (not illustrated) covering at least a part of first dielectric layer 121. First dielectric layer 121 contains an oxide of the first metal derived from anode body 110. The second dielectric layer contains an oxide of a second metal.

Anode body 110 is obtained by roughening a surface of a metal foil containing the first metal by etching or the like, and includes core part 111 and porous part 112 disposed on a surface of core part 111. First dielectric layer 121 covers at least a part of porous part 112. Porous part 112 has a plurality of pits (holes) 112P. The dielectric layers (first dielectric layer 121 and the second dielectric layer) cover an outer surface of porous part 112 and an inner wall surface of each of pits 112P. First dielectric layer 121 can be formed up to the surface of the deepest part of pit 112P. The second dielectric layer can be formed up to the surface of the deepest part of pit 112P by, for example, the ALD method.

First dielectric layer 121 includes first part 121a having thickness $T_1$ and second part 121b having thickness $T_2$ smaller than thickness $T_1$. Porous part 112 has region 112A located at a side close to a surface of anode body 110 and region 112B other than region 112A (located at a side close to core part 111). First dielectric layer 121 has second part 121b in region A (region 112A) and has first part 121a in region B (region 112B). Second part 121b is formed by removing a part of first dielectric layer 120 having thickness $T_1$ in region 112A by the ALE method or a surface treatment by acid immersion. The ALE method or the surface treatment by acid immersion is applied to the first dielectric layer covering the outer surface of porous part 112 and the inner wall surface of pit 112P from the outer surface of porous part 112 to a certain depth so that region 112A has thickness $D_A$.

Second part 121b covers the outer surface of porous part 112 as well as the inner wall surface of pit 112P from the outer surface of porous part 112 to a boundary (depth corresponding to thickness $D_A$ of region A) between region 112A and region 112B. Further, first part 121a covers the inner wall surface of pit 112P from the boundary between region 112A and region 112B of porous part 112 (depth corresponding to thickness $D_A$ of region A) to the deepest part (depth corresponding to thickness $D_0$ of the porous part).

Thickness Do of porous part 112 is in a range from 1/10 to 4/10, inclusive, of a thickness of anode body 110, for example. Thickness Do of the porous part is determined by measuring a thickness of the porous part at ten arbitrary points in a cross-sectional image of the electrode foil obtained by a scanning electron microscope (SEM) or a transmission electron microscope (TEM), and calculating an average value thereof.

A ratio (($D_A$/Do)×100) of thickness $D_A$ of region 112A to thickness $D_0$ of porous part 112 may be in a range from 0.1% to 99.9%, inclusive, or in a range from 50% to 99.9% inclusive, and preferably in a range from 80% to 99.9% inclusive. When the ratio is 80% or more, it is easy to increase the electrostatic capacity by reducing the influence of the first dielectric layer.

Thickness $D_A$ of region A (region 112A) can be obtained by the following method.

A cross section of the electrode foil is observed with the SEM or TEM, and a boundary (boundary between region A and region B) where the thickness of the first dielectric layer covering the inner wall surface of the pit rapidly changes is found in a region between the outer surface of the porous part and the deepest part (depth corresponding to thickness $D_0$). A distance (depth) in a thickness direction of the porous part from the outer surface of the porous part to the boundary is measured. The distance (depth) is measured for each of ten arbitrary points in the boundary, and an average value thereof is calculated and taken as thickness $D_A$ of region A. Further, a value obtained by bag subtracting thickness $D_A$ of region A from thickness $D_0$ of the porous part is defined as thickness DB of region B.

A ratio $T_2/T_1$ of thickness $T_2$ of second part 121b to thickness $T_1$ of first part 121a is preferably in a range from 0.01 to 0.6, inclusive, and more preferably in a range from 0.01 to 0.1, inclusive. In this case, it is easy to obtain an effect of improving the capacitance by reducing the thickness of the first dielectric layer from $T_1$ to $T_2$.

Thickness $T_1$ of first part 121a may be, for example, in a range from 1 nm to 10 nm, inclusive. Thickness $T_2$ of second part 121b may be in a range from 0.1 nm to 6 nm, inclusive, and may be in a range from 0.1 nm to 1 nm, inclusive. When thickness $T_2$ is 0.1 nm or more, a leak current is easily reduced. It is easy to obtain an effect of securing insulating properties by compensating defects of the second dielectric layer with the first dielectric layer, and an effect of suppressing diffusion of the metal contained in the anode body into the second dielectric layer by the first dielectric layer. The thickness of the second dielectric layer is preferably greater than thickness $T_2$ of second part 121b, and more preferably greater than thickness $T_1$ of first part 121a. The thickness of the second dielectric layer ranges, for example, from 0.1 nm to 10 nm, inclusive.

Thickness $T_2$ of the second part in region A is determined by measuring thicknesses at ten arbitrary points of the second part in region A in a cross-sectional image of the electrode foil obtained by the SEM or TEM, and calculating an average value of the thicknesses. Similarly, thickness $T_1$ of the first part in region B is obtained by measuring thicknesses at ten arbitrary points of the first part in region B, and calculating an average value thereof. The thickness of the second dielectric layer may be determined in the same manner.

[Electrolytic Capacitor]

An electrolytic capacitor according to the present exemplary embodiment includes the electrode foil, and a solid electrolyte layer covering at least a part of the second dielectric layer of the electrode foil. The solid electrolyte layer contains a conductive polymer (π-conjugated polymer). Examples of the conductive polymer include polypyrrole, polythiophene, polyaniline, derivatives thereof, and the like.

The electrolytic capacitor may further contain a solvent. The solvent preferably contains a glycol compound and/or a glycerin compound (hereinafter, also referred to as a glycol compound and the like). The glycol compound and the like may be contained in an electrolytic solution to be described later. When the solvent contains the glycol compound and the like, orientation or crystallinity of the π-conjugated polymer contained in the solid electrolyte layer can be enhanced. As a result, conductivity of the solid electrolyte layer is improved, and an equivalent series resistance (ESR) of the electrolytic capacitor is lowered. Further, contact property between the solid electrolyte layer and the second dielectric layer is improved, and withstand voltage characteristics are improved.

Examples of the glycol compound include ethylene glycol, diethylene glycol, triethylene glycol, propylene glycol, polyalkylene glycol having a molecular weight from 190 to 400, and the like. Examples of the glycerin compound include glycerin, polyglycerin, and the like. A polymerization degree of the polyglycerin is preferably in a range from 2 to 20, inclusive. The glycol compound and the like may be used alone or in combination of two or more kinds thereof.

The electrolytic capacitor may further include an electrolytic solution. By using the electrolytic solution, an electrolytic capacitor having a superior function of repairing the dielectric layer can be obtained. The electrolytic solution contains, for example, a solvent and an ionic substance (solute, e.g., organic salt) dissolved in the solvent.

The solvent may be an organic solvent or an ionic liquid. The solvent is preferably a high boiling solvent. For example, carbonate compounds such as propylene carbonate, cyclic sulfones such as sulfolane, lactones such as γ-butyrolactone, amides such as N-methylacetamide, N,N-dimethylformamide, and N-methyl-2-pyrrolidone, esters such as methyl acetate, ethers such as 1,4-dioxane, ketones such as methyl ethyl ketone, formaldehyde, and the like can be used. The solvents may be used alone or in combination of two or more kinds thereof.

The organic salt is a salt in which at least one of an anion and a cation contains an organic substance. As the organic salt, for example, trimethylamine maleate, triethylamine borodisalicylate, ethyldimethylamine phthalate, mono-1,2,3,4-tetramethylimidazolinium phthalate, mono-1,3-dimethyl-2-ethyl imidazolinium phthalate, and the like may be used. The organic salts may be used alone or in combination of two or more kinds thereof

[Method for Manufacturing Electrolytic Capacitor]

A method for manufacturing an electrolytic capacitor according to the present exemplary embodiment includes a first step of obtaining an anode body containing a first metal. An anode body includes a core part and a porous part disposed on a surface of the core part, and at least a part of the porous part is covered with a first dielectric layer. The above manufacturing method further includes a second step of removing at least a part of the first dielectric layer by an atomic layer etching (ALE) method or acid immersion, and a third step of obtaining an electrode foil by forming a second dielectric layer so as to cover at least a part of the porous part.

By removing at least a part of the first dielectric layer in the second step, since the influence of the first dielectric layer is reduced, the decrease in capacitance due to the first dielectric layer is suppressed. By reducing the influence of the first dielectric layer, the action of the second dielectric layer formed in the third step is efficiently exhibited, and the performance of the electrolytic capacitor is easily improved by the second dielectric layer.

Hereinafter, each step will be described in detail.

(First Step)

The anode body is usually obtained by roughening a surface of a base material such as a metal foil containing the first metal by etching treatment or the like. The metal foil may be a foil of the first metal or an alloy foil containing the first metal. A thickness of the metal foil is not particularly limited, but ranges, for example, from 15 μm to 300 μm, inclusive. With the roughening, a plurality of pits are formed on a surface of the metal foil. At least a part of the porous part of the anode body is covered with the first dielectric layer. The first dielectric layer includes a natural oxide film and can be formed by natural oxidation of the surface of the metal foil. The natural oxide film may be formed on a surface of the deepest part of each of the pits.

A hole diameter of the pit formed on the surface of the metal foil is not particularly limited, but preferably ranges from 50 nm to 2,000 nm, inclusive, from the viewpoint of increasing a surface area and facilitating formation of the second dielectric layer deep inside the pit. The hole diameter of the pit is a most frequent hole diameter of a fine hole distribution measured by, for example, a mercury porosimeter. A depth of the pit is also not particularly limited, and may be set appropriately according to the thickness of the metal foil. In particular, from the viewpoint of increasing the surface area and maintaining the strength of the electrode foil, thickness $D_0$ of the etching region (porous part) where pits are formed is preferably in a range from 1/10 to 4/10, inclusive, of the thickness of the metal foil before being etched.

(Second Step)

In the second step, at least a part of the first dielectric layer is removed by the ALE method or acid immersion. A thin layer in units of atomic layers can be removed from the first dielectric layer by the ALE method. In the ALE method, since etching is performed using a reaction gas, the first dielectric layer up to the deepest part of the porous part (pit) having a complicated structure can be removed. In the ALE method, by functioning a self-limiting action, etching can be performed in units of atomic layers. Since an etching rate in a region close to the outer surface is the same as an etching rate in a deepest part of the porous part, it is easy to make an etching depth (a thickness for removing the first dielectric layer) uniform. In the acid immersion, the first dielectric layer is dissolved and removed by immersion in an acid for a certain period of time. The solution used in the acid immersion is, for example, sulfuric acid, nitric acid, phosphoric acid, oxalic acid, or a salt thereof, or at least one or more kinds thereof. The hydrogen ion concentration of the solution used in the acid immersion is in a range from 0.5 mol/L to 2.5 mol/L, inclusive, and preferably in a range from 1.0 mol/L to 2.0 mol/L, inclusive. If the hydrogen ion concentration is too high, the anode body core part and the porous part disposed on the surface of the core part are also dissolved, so that the porosity is lowered and a sufficient electrostatic capacity cannot be obtained. On the other hand, if the hydrogen ion concentration is too low, an effect of dissolving the first dielectric layer cannot be sufficiently obtained. A temperature of the solution used in the acid immersion is in a range from 25° C. to 70° C., inclusive, and preferably in a range from 35° C. to 65° C., inclusive. When the temperature is too high, the anode body core part and the porous part disposed on the surface of the core part are also dissolved, so that the porosity is lowered and a sufficient electrostatic capacity cannot be obtained. On the other hand, if the temperature is too low, an effect of dissolving the first dielectric layer cannot be sufficiently obtained. The time for performing the acid immersion is in a range from 30 seconds to 300 seconds, inclusive, and preferably in a range from 60 seconds to 250 seconds, inclusive. If the immersion time is too long, the anode body core part and the porous part disposed on the surface of the core part are also dissolved, so that the porosity is lowered and a sufficient electrostatic capacity cannot be obtained. On the other hand, when the immersion time is too short, an effect of dissolving the first dielectric layer cannot be sufficiently obtained. The acid immersion can be realized at lower cost than the ALE method. All of the first dielectric layer may be completely removed by the second step, or a part of the first dielectric layer may slightly remain to be a thin layer without being removed.

In the second step, an entire region of the porous part (all of the outer surface of the porous part and the inner wall surface of the pit) may be subjected to surface treatment by the ALE method or acid immersion. Further, region A (the outer surface of the porous part and the inner wall surface of the pit from the outer surface of the porous part to a certain depth (depth corresponding to thickness $D_A$ in FIG. 1)), which is located at a side close to the surface of the anode body, may be subjected to surface treatment by the ALE method or acid immersion.

In the ALE method, a chemical modification step of acting only on an atomic layer of an outermost surface of an object, and an etching step of removing only a chemically modified part are alternately repeated. The thickness for removing the first dielectric layer can be controlled by the number of times (cycle number) of repeating the chemical modification step and the etching step. Each of the chemical modification step and the etching step may be performed by supplying a reaction gas into a reaction chamber in which the object is disposed.

Hereinafter, an example of a case where the surface treatment by the ALE method is performed on the anode body in which the surface of the porous part is covered with the first dielectric layer will be described. Here, a case where the first dielectric layer is an $Al_2O_3$ layer, the reaction gas (first reaction material) supplied in the chemical modification step is HF, and the reaction gas (second reaction material) supplied in the etching step is $Al(CH_3)_3$ is shown.

First, in the chemical modification step, the $Al_2O_3$ layer is brought into contact with the HF gas. At this time, a fluorination reaction of the following formula (1) proceeds, $AlF_3$ is generated together with water vapor, and a part (atomic layer) of the outermost surface of the $Al_2O_3$ layer is modified to $AlF_3$.

$$Al_2O_3 + 6HF \rightarrow 2AlF_3 + 3H_2O \tag{1}$$

Next, in the etching step, the atomic layer of $AlF_3$ formed is brought into contact with a gas of $Al(CH_3)_3$. At this time, a ligand exchange reaction of the following formula (2) proceeds, a volatile substance of $AlF(CH_3)_2$ is generated, and an atomic layer of $AlF_3$ is removed.

$$AlF_3 + 2Al(CH_3)_3 \rightarrow 3AlF(CH_3)_2 \tag{2}$$

The chemical modification step and the etching step are alternately repeated. The chemical modification step and the etching step are performed, for example, under a temperature condition ranging from 100° C. to 400° C., inclusive. In this case, thermal damage to the metal foil is suppressed. As the first reaction material, a fluorine-containing material such as $F_2$, $CF_4$, $NF_3$, $ClF_3$, or $XeF_2$ other than HF may be used.

As the second reaction material, an alkyl metal complex other than $Al(CH_3)_3$, a β-diketonate metal complex such as tin (II) acetylacetonate: $Sn(acac)_2$, or the like may be used. When the second reaction material is $Sn(acac)_2$, volatile substances of $SnF(acac)_2$ and $Al(acac)_3$ are generated by a ligand exchange reaction of the following formula (3), and an atomic layer of $AlF_3$ is removed.

$$AlF_3 + 3\ Sn(acac)_2 \rightarrow Al(acac)_3 + 3\ SnF(acac)_2 \quad (3)$$

Each of the chemical modification step and the etching step may be performed by supplying the reaction gas (first reaction material and second reaction material) into the reaction chamber in which the anode body is disposed. In this case, thickness $D_A$ of region A (a depth from the outer surface of the porous part subjected to the surface treatment by the ALE method) can be controlled by, for example, an amount of gas (gas concentration) supplied into the reaction chamber, a temperature and pressure in the reaction chamber, and the like.

In the second step, the thickness of at least a part of the first dielectric layer may be reduced from thickness $T_1$ to thickness $T_2$ by the ALE method or acid immersion. Thickness $T_1$ of the first dielectric layer is determined by measuring thicknesses at ten arbitrary points in a cross-sectional image by the SEM or TEM of the first dielectric layer before surface treatment by the ALE method, and calculating an average value thereof. Thickness $T_2$ of the first dielectric layer after the surface treatment by the ALE method may be determined in the same manner.

In the second step, the thickness of the first dielectric layer may be reduced from thickness $T_1$ to thickness $T_2$ in at least region A located at a side close to the surface of the anode body in the porous part by the ALE method or acid immersion. A ratio $((D_A/D_0) \times 100)$ of thickness $D_A$ of region A to thickness $D_0$ of the porous part may be, for example, in a range from 0.1% to 99.9%, inclusive, or in a range from 50% to 99.9%, inclusive, and preferably in a range from 80% to 99.9%, inclusive. A ratio $T_2/T_1$ of thickness $T_2$ to thickness $T_1$ is preferably in a range from 0.01 to 0.6, inclusive, and more preferably in a range from 0.01 to 0.1, inclusive. Thickness $T_2$ may be in a range from 0.1 nm to 6 nm, inclusive, or in a range from 0.1 nm to 1 nm, inclusive. Thickness $T_1$ may be in a range from 1 nm to 10 nm, inclusive.

(Third Step)

In the third step, the second dielectric layer containing the oxide of the second metal is formed so as to cover at least a part of the first dielectric layer. The porous part of the anode body is covered with the second dielectric layer directly or via the first dielectric layer.

In the third step, the second dielectric layer is preferably formed by an atomic layer deposition (ALD) method. In the ALD method, a dense and uniform second dielectric layer can be formed. In the ALD method, variations in the values of the thicknesses of the second dielectric layers measured at 10 points for obtaining the thickness of the second dielectric layer are small, and the standard deviation is, for example, less than or equal to 0.5 nm.

The ALD method is a film formation method in which a source gas containing the second metal and an oxidizing agent are alternately supplied to a reaction chamber where an object is disposed to form the second dielectric layer containing the oxide of the second metal on a surface of the object. In the ALD method, by functioning a self-limiting action, the second metal is deposited on the surface of the object in units of atomic layers. Thus, the thickness of the second dielectric layer is controlled by the number of cycles in which supply of the source gas→exhaust (purge) of the source gas→supply of the oxidizing agent→exhaust (purge) of the oxidizing agent is taken as one cycle. That is, the ALD method can easily control the thickness of the second dielectric layer to be formed.

Note that the ALD method can be performed under a temperature condition ranging from 100° C. to 400° C., inclusive, as compared with CVD generally performed under a temperature condition ranging from 400° C. to 900° C., inclusive. That is, the ALD method is advantageous in being able to suppress thermal damage to the metal foil.

Examples of the oxidizing agent used in the ALD method include water, oxygen, ozone, and the like. The oxidizing agent may be supplied to the reaction chamber as plasma using the oxidizing agent as a raw material.

The second metal is supplied to the reaction chamber as a gas of a precursor containing the second metal. The precursor is, for example, an organometallic compound containing the second metal, and thus, the second metal is easily chemically adsorbed to the object. As the precursor, various organometallic compounds, conventionally used in the ALD method, can be used.

Examples of the precursor containing Al include trimethylaluminum $((CH_3)_3Al)$ and triethylaluminum $((C_2H_5)_3Al)$.

Examples of a precursor containing Ta include (t-butylimide) tris (ethylmethylamino) tantalum (V) $(C_{13}H_{33}N_4Ta$, TBTEMT), tantalum (V) pentaethoxide (Ta $(OC_2H_5)_5)$, (t-butylimide) tris (diethylamino) tantalum (V) $((CH_3)_3CNTa(N(C_2H_5)_2)_3)$, and pentakis (dimethylamino) tantalum (V) $(Ta(N(CH_3)_2)_5)$.

Examples of the precursor containing Nb include niobium (V) ethoxide $(Nb(OCH_2CH_3)_5$, and tris (diethylamide) (t-butylimide) niobium (V) $(C_{16}H_{39}N_4Nb)$.

Examples of the precursor containing Si include N-sec-butyl (trimethylsilyl) amine $(C_7H_{19}NSi)$, 1,3-diethyl-1,1,3,3-tetramethyldisilazane $(C_8H_{23}NSi_2)$, 2,4,6,8,10-pentamethylcyclopentasiloxane $((CH_3SiHO)_5)$, pentamethyldisilane $((CH_3)_3SiSi(CH_3)_2H)$, tris (isopropoxy) silanol $([(H_3C)_2CHO]_3SiOH)$, chloropentamethyldisilane $((CH_3)_3SiSi(CH_3)_2Cl)$, dichlorosilane $(SiH_2Cl_2)$, tridimethylaminosilane $(Si[N(CH_3)_2]_4)$, tetraethylsilane $(Si(C_2H_5)_4)$, tetramethylsilane $(Si(CH_3)_4)$, tetraethoxysilane $(Si(OC_2H_5)_4)$, dodecamethylcyclohexasilane $((Si(CH_3)_2)_6)$, silicon tetrachloride $(SiCl_4)$, and silicon tetrabromide $(SiBr_4)$.

Examples of a precursor containing Ti include bis (t-butylcyclopentadienyl) titanium (IV) dichloride $(C_{18}H_{26}Cl_2Ti)$, tetrakis (dimethylamino) titanium (IV) $([(CH_3)_2N]_4Ti$, TDMAT), tetrakis (diethylamino) titanium (IV) $([(C_2H_5)_2N]_4Ti)$, tetrakis (ethylmethylamino) titanium (IV) $(Ti[N(C_2H_5)(CH_3)]_4)$, titanium (IV) (diisopropoxy) dobis (2,2,6,6-tetramethyl-3,5-heptanedionate $(Ti[OCC(CH_3)_3CHCOC(CH_3)_3]_2(OC_3H_7)_2)$, titanium tetrachloride $(TiCl_4)$, titanium (IV) isopropoxide $(Ti[OCH(CH_3)_2]_4)$, and titanium (IV) ethoxide $(Ti[O(C_2H_5)]_4)$.

Examples of a precursor containing Zr include bis (methyl-$\eta^5$ cyclopentadienyl) methoxymethyl zirconium $(Zr(CH_3C_5H_4)_2CH_3OCH_3)$, tetrakis (dimethylamido) zirconium (IV) $([(CH_3)_2N]_4Zr)$, tetrakis (Ethylmethylamido) zirconium (IV) $(Zr(NCH_3C_2H_5)_4)$, and zirconium (IV) t-butoxide $(Zr[OC(CH_3)_3]_4)$.

Examples of a precursor containing Hf include hafnium tetrachloride $(HfCl_4)$, tetrakis dimethylamino hafnium $(Hf[N(CH_3)_2]_4)$, tetrakis ethylmethylamino hafnium $(Hf[N(C_2H_5)(CH_3)]_4)$, tetrakis diethylamino hafnium $(Hf[N(C_2H_5)_2]_4)$, and hafnium-t-butoxide $(Hf[OC(CH_3)_3]_4)$.

(Fourth Step)

The method for manufacturing an electrolytic capacitor may include a fourth step of forming a solid electrolyte layer containing a conductive polymer so as to cover at least a part of the second dielectric layer of the electrode foil. The solid electrolyte layer can be formed, for example, by subjecting a raw material monomer to chemical polymerization or electrolytical polymerization on the second dielectric layer of the electrode foil. Alternatively, the solid electrolyte layer may be formed by applying a solution in which the conductive polymer is dissolved or a dispersion liquid in which the conductive polymer is dispersed to the second dielectric layer of the electrode foil. After the fourth step (after formation of the solid electrolyte layer), the electrode foil may be further impregnated with a solvent or an electrolytic solution.

Figure 2:
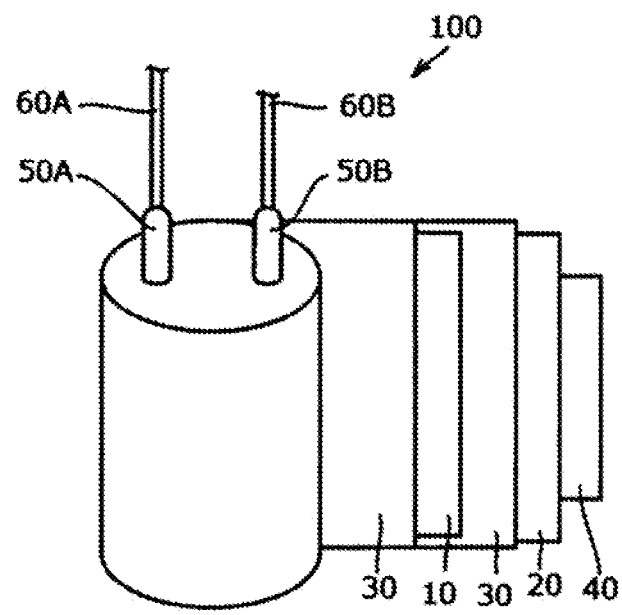
FIG. 2 is a perspective view schematically illustrating a configuration of a wound body included in an electrolytic capacitor according to an exemplary embodiment of the present disclosure.

When the anode body having the dielectric layer is an electrode foil (anode foil) as illustrated in FIG. 1, wound body 100 as illustrated in FIG. 2 may be prepared before the fourth step. FIG. 2 is a developed view for explaining a configuration of wound body 100.

When wound body 100 is produced, cathode foil 20 is prepared in addition to anode foil 10. For cathode foil 20, a metal foil can be used similarly to anode foil 10. A type of the metal that constitutes cathode foil 20 is not particularly limited, but a valve metal, such as Al, Ta, or Nb, or an alloy containing the valve metal can be used. A surface of cathode foil 20 may be roughened as necessary.

Next, anode foil 10 and cathode foil 20 are wound with separator 30 interposed therebetween. End parts on one side of lead tabs 50A and 50B are connected to anode foil 10 and cathode foil 20, respectively, and wound body 100 is formed while lead tabs 50A and 50B are being rolled in. Lead wires 60A and 60B are connected to end parts on the other side of lead tabs 50A and 50B, respectively.

Separator 30 is not particularly limited, and for example, unwoven fabric containing cellulose, polyethylene terephthalate, vinylon, aramid fiber, or the like as a main component, can be used.

Next, winding stop tape 40 is disposed on an outer surface of cathode foil 20 positioned at an outermost layer of wound body 100, and an end part of cathode foil 20 is fixed with winding stop tape 40. Note that, when anode foil 10 is prepared by cutting a large foil, an anodizing treatment may further be performed on wound body 100 in order to provide the dielectric layer on a cutting surface.

The solid electrolyte layer is formed between anode foil 10 and cathode foil 20 by impregnating wound body 100 with a solution in which the conductive polymer is dissolved or a dispersion liquid in which the conductive polymer is dispersed. Wound body 100 after formation of the solid electrolyte layer may be further impregnated with an electrolytic solution. Examples of a method for impregnation with a solution or the like include a method for immersing wound body 100 in the solution or the like stored in a container, and a method for dropping a solution or the like onto wound body 100. The impregnation may be performed in an atmosphere with a reduced pressure ranging, for example, from 10 kPa to 100 kPa, inclusive, preferably from 40 kPa to 100 kPa, inclusive.

Figure 3:
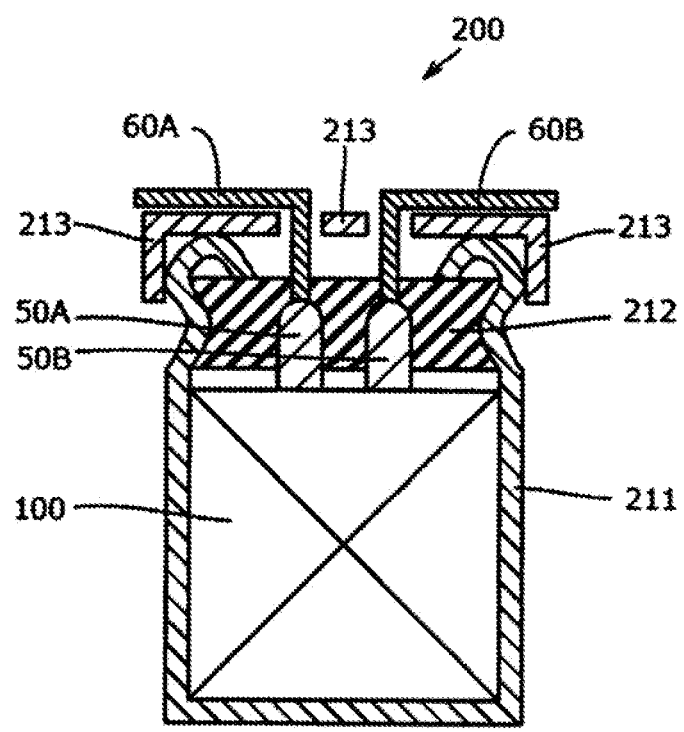
FIG. 3 is a cross-sectional view schematically illustrating the electrolytic capacitor according to an exemplary embodiment of the present disclosure.

Next, wound body 100 is sealed, so that electrolytic capacitor 200 as illustrated in FIG. 3 is obtained. In order to manufacture electrolytic capacitor 200, wound body 100 is first housed in bottomed case 211 such that lead wires 60A, 60B are positioned on an opening side of bottomed case 211. As a material of bottomed case 211, a metal such as aluminum, stainless steel, copper, iron, or brass, or an alloy thereof can be used.

Next, sealing member 212 formed such that lead wires 60A, 60B penetrate through is disposed above wound body 100, and wound body 100 is sealed in bottomed case 211. Sealing member 212 may be an insulating substance, and is preferably an elastic body. Among these materials, silicone rubber, fluororubber, ethylene propylene rubber, Hypalon™ rubber, butyl rubber, isoprene rubber, and the like, having high heat resistance, are preferable.

Next, transverse drawing is performed on a part near an opening end of bottomed case 211, and curling is performed by swaging the opening end toward sealing member 212. Finally, base plate 213 is disposed on the curled part, which results in completion of the sealing. Thereafter, an aging treatment may be performed while a rated voltage is being applied.

In the above exemplary embodiment, although the wound electrolytic capacitor has been described, an application range of the present disclosure is not limited to the above wound electrolytic capacitor, and the present disclosure can also be applied to other electrolytic capacitors, for example, stacked electrolytic capacitors.

EXAMPLES

Hereinafter, the present disclosure will be described in more detail based on examples, but the present disclosure is not limited to the examples.

Example 1

A wound electrolytic capacitor (1 (diameter) 6.3 mm×L (length) 9.9 mm) having a rated voltage of 2.0 V was prepared. A specific method for manufacturing an electrolytic capacitor will be described below.
(Production of Anode Foil)
(First Step)

An aluminum foil having a thickness of 100 μm was prepared. The aluminum foil was subjected to a direct current etching treatment to roughen a surface, thereby obtaining an anode body. An etching region (porous part) having a thickness of 40 μm was formed on the surface of the aluminum foil, and a hole size of the pit was 100 nm to 200 nm. The aluminum foil (anode body) whose surface was roughened was allowed to stand in the atmosphere for 168 hours. A first dielectric layer (natural oxide film) having a thickness of 10 nm was formed on the surface of the aluminum foil so as to cover the surface of fine irregularities of the aluminum foil.
(Second Step)

A part of the first dielectric layer was removed by the ALE method (first reaction material: HF, second reaction material: $Al(CH_3)_3$, temperature: 300° C., pressure: 1 Pa). At this time, in region A from the outer surface of the porous part to a certain depth, the thickness of the first dielectric layer decreased from thickness $T_1$ to thickness $T_2$. The number of cycles of the ALE method (chemical modification step and etching step) was adjusted so that thickness $T_2$ was a value shown in Table 1.
(Third Step)

A second dielectric layer was formed by the ALD method (precursor: $[(CH_3)_2N]_4Ti$, oxidizing agent: $O_3$, temperature: 300° C., pressure: 1 Pa) so as to cover the first dielectric layer. The number of cycles of the ALD method was prepared so that the thickness of the second dielectric layer was a value shown in Table 1. In this way, an anode body (anode foil), having the first dielectric layer and the second dielectric layer in this order on the surface, was obtained. Thereafter, the anode foil was cut into a predetermined size.

EDX analysis confirmed that the second dielectric layer was a $TiO_2$ layer and the first dielectric layer was an $Al_2O_3$ layer. Thickness $D_0$ of the porous part determined by the method described above was 40 μm, and thickness $D_A$ of region A of the porous part was 36 μm. A ratio of thickness $D_A$ of region A to thickness $D_0$ of the porous part was 90%. Thickness $T_2$ of the second part of the first dielectric layer in region A obtained by the method described above was 0.1 nm, and thickness $T_1$ of the first part of the first dielectric layer in region B was 10 nm. $T_2/T_1$ was 0.01. The thickness of the second dielectric layer determined by the method described above was 15.6 nm.

(Production of Cathode Foil)

An aluminum foil having a thickness of 50 μm was subjected to an etching treatment to roughen the surface of the aluminum foil, thereby obtaining a cathode foil. Thereafter, the cathode foil was cut into a predetermined size.

(Production of Wound Body)

An anode lead tab and a cathode lead tab were connected to the anode foil and the cathode foil, respectively. The anode foil and the cathode foil were wound with a separator interposed therebetween while the lead tabs were being rolled in. An anode lead wire and a cathode lead wire were connected to end parts of the lead tabs protruding from the wound body, respectively. Then, the produced wound body was subjected to an anodizing treatment again to form a dielectric layer at a cut end part of the anode foil. Next, an end part of an outer surface of the wound body was fixed with a winding stop tape.

(Preparation of Conductive Polymer Dispersion Liquid)

A mixed solution was prepared by dissolving 3,4-ethylenedioxythiophene and polystyrenesulfonic acid as a dopant in ion-exchanged water. While the obtained mixed solution was being stirred, iron (III) sulfate (oxidizing agent) that had been dissolved in the ion-exchanged water was added to the mixed solution to cause a polymerization reaction. After the reaction, the obtained reaction solution was dialyzed to remove unreacted monomers and an excessive oxidizing agent, so that a conductive polymer dispersion liquid was obtained that contained about 5% by mass of polyethylenedioxythiophene doped with polystyrenesulfonic acid.

(Formation of Solid Electrolyte Layer)

The wound body was immersed in the conductive polymer dispersion liquid housed in a predetermined container in a decompressed atmosphere (40 kPa) for 5 minutes. Then, the wound body was picked up from the conductive polymer dispersion liquid. Next, the wound body that had been impregnated with the conductive polymer dispersion liquid was dried in a drying furnace at 150° C. for 20 minutes to form a solid electrolyte layer containing the conductive polymer between the anode foil and the cathode foil.

(Sealing of Wound Body)

The wound body including the solid electrolyte layer was sealed to complete the electrolytic capacitor illustrated in FIG. 3. Then, an aging treatment was performed at 130° C. for 2 hours while a rated voltage was being applied.

Examples 2 to 5

In the production of the anode foil, thickness $T_2$ of the second part of the first dielectric layer was set to the value shown in Table 1 by changing the number of cycles of the ALE method. The thickness of the second dielectric layer was set to the value shown in Table 1 by changing the number of cycles of the ALD method. An electrolytic capacitor was produced in the same manner as in Example 1 except for the above.

Comparative Example 1

In the production of the anode foil, the surface treatment (second step) by the ALE method was not performed on the anode body whose surface was covered with the first dielectric layer. The thickness of the second dielectric layer was set to the value shown in Table 1 by changing the number of cycles of the ALD method. An electrolytic capacitor was produced in the same manner as in Example 1 except for the above.

[Evaluation]

The electrostatic capacity of the electrolytic capacitor obtained above was measured. The electrostatic capacity was expressed as an index (relative value) where the electrostatic capacity of the electrolytic capacitor of Comparative Example 1 was 1. The evaluation results are shown in Table 1.

TABLE 1

|  | First dielectric layer | | | | Second dielectric layer | | Electrostatic |
|  | --- | --- | --- | --- | --- | --- | --- |
|  | Oxide of first metal | Thickness $T_1$ of first part (nm) | Thickness $T_2$ of second part (nm) | $T_2/T_1$ | Oxide of second metal | Thickness (nm) | capacity (index) |
| Example 1 | $Al_2O_3$ | 10 | 0.1 | 0.01 | $TiO_2$ | 15.6 | 8.29 |
| Example 2 | $Al_2O_3$ | 10 | 1 | 0.1 | $TiO_2$ | 15.2 | 4.99 |
| Example 3 | $Al_2O_3$ | 10 | 2 | 0.2 | $TiO_2$ | 14.7 | 3.46 |
| Example 4 | $Al_2O_3$ | 10 | 4 | 0.4 | $TiO_2$ | 13.8 | 2.14 |
| Example 5 | $Al_2O_3$ | 10 | 6 | 0.6 | $TiO_2$ | 12.9 | 1.55 |
| Comparative example 1 | $Al_2O_3$ | 10 | — | — | $TiO_2$ | 11.1 | 1 |

The electrostatic capacities of the electrolytic capacitors of Examples 1 to 5 were greater than that of the electrolytic capacitor of Comparative Example 1. In particular, in Examples 1 and 2, high values in electrostatic capacities were obtained.

The electrode foil according to the present disclosure can be used for capacitors for various applications in order to improve capacitance.

The invention claimed is:

1. An electrode foil for an electrolytic capacitor, the electrode foil comprising:
    an anode foil including a core foil and a porous layer
        laminated on a main surface of the core foil in a thickness direction of the core foil, the anode foil containing a first metal;

a first dielectric layer covering at least a part of the porous layer; and a second dielectric layer covering at least a part of the first dielectric layer, the second dielectric layer containing an oxide of a second metal, wherein:

the first dielectric layer includes a first part having a thickness $T_1$, and a second part having a thickness $T_2$ smaller than the thickness $T_1$, the porous layer includes a region A located at a side close to a surface of the anode foil, and a region B other than the region A, the region B is located away from the surface of the anode foil and closer to the core foil than the region A, the second part of the first dielectric layer is disposed in the region A, and the first part of the first dielectric layer is disposed in the region B, and a ratio $T_2/T_1$ of the thickness $T_2$ to the thickness $T_1$ is in a range from 0.01 to 0.6, inclusive.

2. The electrode foil according to claim 1, wherein the region A has a thickness $D_A$ ranging from 50% to 99.9%, inclusive, of a thickness $D_0$ of the porous layer.

3. The electrode foil according to claim 1, wherein the thickness $T_2$ is in a range from 0.1 nm to 6 nm, inclusive.

4. The electrode foil according to claim 1, wherein the thickness $T_1$ is in a range from 1 nm to 10 nm, inclusive.

5. The electrode foil according to claim 1, wherein the first dielectric layer contains an oxide of the first metal.

6. The electrode foil according to claim 1, wherein the first metal contains at least one selected from the group consisting of titanium, tantalum, niobium, and aluminum.

7. The electrode foil according to claim 1, wherein the second metal contains at least one selected from the group consisting of tantalum, titanium, hafnium, zirconium, niobium, silicon, and aluminum.

8. An electrolytic capacitor comprising:
   the electrode foil according to claim 1; and
   a solid electrolyte layer covering at least a part of the second dielectric layer of the electrode foil, the solid electrolyte layer containing a conductive polymer.

9. The electrolytic capacitor according to claim 8, further comprising a solvent or an electrolytic solution.

10. The electrode foil according to claim 1, wherein the second part of the first dielectric layer is separated from the core foil.

11. The electrode foil according to claim 1, wherein the first part of the first dielectric layer is not exposed from the anode foil at the surface of the anode foil.

12. The electrode foil according to claim 1, wherein the second part of the first dielectric layer is disposed only in the region A, and the first part of the first dielectric layer is disposed only in the region B.

13. The electrode foil according to claim 1, wherein a thickness DO of the porous layer is 10% or more or 40% or less of a thickness of the anode foil.

* * * * *